O. O. CLARK.
ANIMAL POKE.
APPLICATION FILED JULY 7, 1909.
971,594.
Patented Oct. 4, 1910.
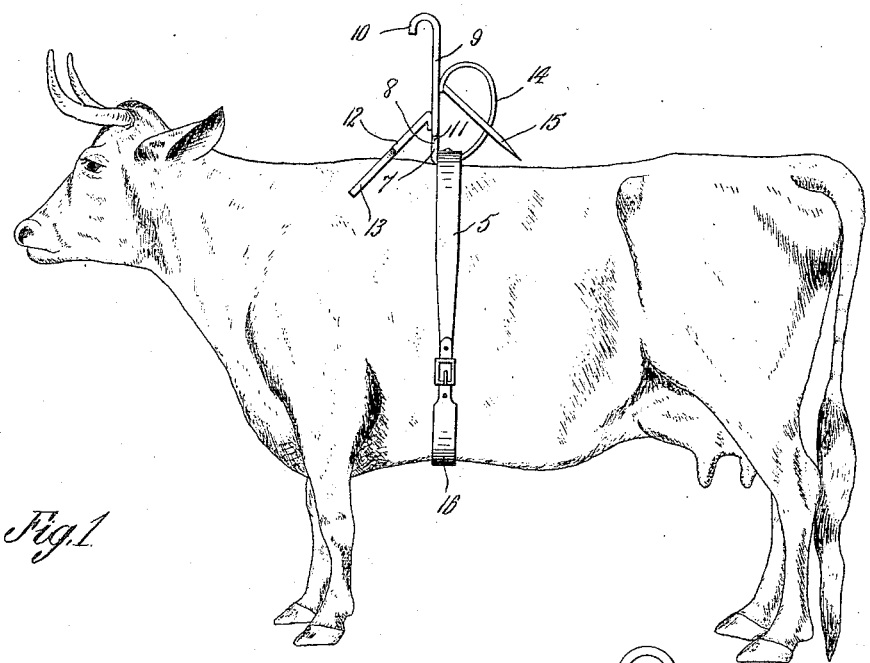
Fig. 1.
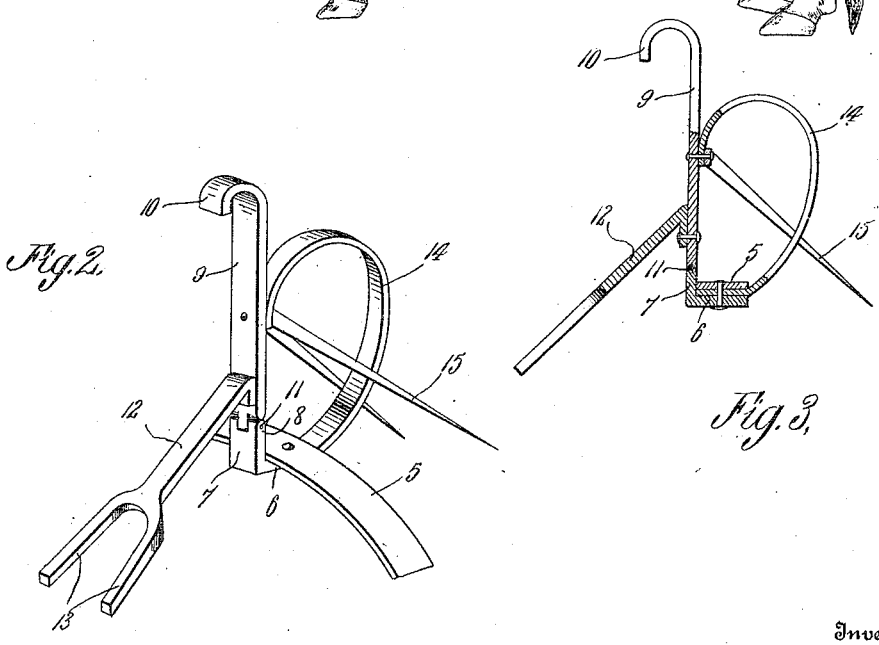
Fig. 2.
Fig. 3.
Witnesses
J. H. Crawford
Inventor
Otis O. Clark,
By Chandler & Chandler
Attorneys

UNITED STATES PATENT OFFICE.

OTIS O. CLARK, OF LIBERAL, KANSAS, ASSIGNOR OF ONE-HALF TO JOE FUEST, OF LIBERAL, KANSAS.

ANIMAL-POKE.

971,594.      Specification of Letters Patent.      Patented Oct. 4, 1910.

Application filed July 7, 1909. Serial No. 506,379.

*To all whom it may concern:*

Be it known that I, OTIS O. CLARK, a citizen of the United States, residing at Liberal, in the county of Seward, State of Kansas, have invented certain new and useful Improvements in Animal-Pokes; and I do hereby declare the following to be a full, clear, and exact description of the invention, such as will enable others skilled in the art to which it appertains to make and use the same.

The invention relates to animal pokes and more particularly to the class of devices for attachment to cows or other analogous animals.

The primary object of the invention is the provision of an animal poke of this character in which a pricking device is readily and easily located upon the back of an animal to prevent the same from going through a wire fence or induce said animal to desist in his attempt.

Another object of the invention is the provision of an animal poke of this character which is simple in construction, thoroughly reliable and efficient in operation, readily and easily mounted upon the body of the animal, and one that is inexpensive in the manufacture.

With these and other objects in view the invention consists in the construction, combination and arrangement of parts as will be hereinafter more fully described in detail, illustrated in the accompanying drawings, which disclose the preferred form of embodiment of the invention to enable those skilled in the art to carry the invention into practice and as brought out in the claim hereunto appended.

In the drawings: Figure 1 is a side elevation of an animal with the invention applied thereto. Fig. 2 is a fragmentary detail perspective view of the poke removed from the animal. Fig. 3 is a side elevation of the same, it being partly shown in section.

In the drawings, the numeral 5 designates a back band which may be of any suitable material, although in this instance it is constructed of leather, to which is centrally connected an L-shaped casting or bracket 6, the latter having a vertical staff 7 bifurcated to form spaced parallel ears 8 between which is hinged an animal poke, as will be hereinafter more fully described.

The animal poke comprises an arm 9 having an upper forwardly and downwardly projecting hook terminal 10, which latter is adapted to engage the fence wires and prevent the same from overriding the said arm or escaping it. The said arm 9 is connected between the spaced ears 8 by means of a pivot 11 to permit the arm 9 to rock upon the bracket when the device is engaging a fence. At a point slightly above the pivotal connection of the arm 9 with the bracket and fixed thereto is a forwardly and downwardly inclined forked extension 12. The outer forked terminal 13 is adapted to straddle the shoulder portion of an animal to limit the forward rocking of the arm 9 when the device is mounted upon the back of an animal.

Secured between the back band 5 and the bracket 6 is one end of a curved leaf spring 14, the opposite end of which is fixed to the rear face of the arm 9 so as to hold the latter in normal substantially vertical position. Secured to the arm 9 at its rear face are the inner ends of rearwardly and downwardly inclined pricker needles or fingers 15, which latter are held normally out of contact with the body of the animal. Upon tilting of the arm 9 rearwardly these fingers 15 are adapted to prick the body of an animal and thus induce him to desist in his attempt to go through a wire fence.

To mount the back band upon the animal, there is provided a belly band 16 which latter is connected to the back band by means of strap terminals engaging the usual form of buckles carried at the terminals of said back band.

In view of this construction it will be seen that if an animal attempts to go through a wire fence, the upper hook terminal of the arm 9 will engage the fence wires and cause the needles or fingers 15 to prick into the body of the animal, and as soon as the pressure upon the arm is stopped the spring 14 will force the arm back to withdraw the needles or fingers 15 and this forward movement of the arm is limited by the forked extension 12 engaging the shoulder portion of the animal's body.

From the foregoing, the construction and operation of the invention will be clearly apparent and therefore it is deemed unnecessary to present a more extended explanation so that the same has been omitted.

What is claimed, is:

The combination with a back band, of a forked ear fixed centrally to the back band, an arm pivotally mounted at its lower end in the forked ear and having a forwardly and downwardly turned opposite hook terminal, a downwardly inclined forked member fixed to the arm above its axis of movement and adapted to normally engage the shoulder of an animal, a bowed leaf spring having one end fixed between the ear and the back band and its opposite end secured to the arm and adapted to hold the forked member normally in engagement with the shoulder of an animal to maintain the arm in vertical position and downwardly diverging inclined pricking fingers fixed to the arm and projecting therefrom in an opposite direction with respect to the forked member, the said fingers being normally out of contact with the back of an animal.

In testimony whereof, I affix my signature, in presence of two witnesses.

OTIS O. CLARK.

Witnesses:
GEO. W. ANDERSON,
J. D. STEPHENS.